US010962130B2

(12) United States Patent
Mandera et al.

(10) Patent No.: US 10,962,130 B2
(45) Date of Patent: Mar. 30, 2021

(54) LUBRICANT RESERVOIR SYSTEM

(71) Applicant: SKF Lubrication Systems Germany GmbH, Walldorf (DE)

(72) Inventors: Markus Mandera, Leimen (DE); Dieter Hess, Ludwigshafen (DE); Tobias Mueller, Kraichtal (DE); Andreas Schoenfeld, Sankt Leon-Rot (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 376 days.

(21) Appl. No.: 15/883,205

(22) Filed: Jan. 30, 2018

(65) Prior Publication Data

US 2018/0224011 A1   Aug. 9, 2018

(30) Foreign Application Priority Data

Feb. 9, 2017   (DE) .......................... 102017202083.0

(51) Int. Cl.
*F16K 21/18*   (2006.01)
*F16N 19/00*   (2006.01)
(Continued)

(52) U.S. Cl.
CPC ............ *F16K 21/18* (2013.01); *F16K 31/363* (2013.01); *F16K 31/465* (2013.01);
(Continued)

(58) Field of Classification Search
CPC .... F16N 13/02; F16N 19/003; F16N 2260/04; F16N 29/02; F16N 29/04; B65D 90/26;
(Continued)

(56) References Cited

U.S. PATENT DOCUMENTS 2,187,684 A    1/1940   Fox et al.
2,614,576 A *  10/1952  Taylor ..................... F16K 31/30
                                                        137/122
(Continued)

FOREIGN PATENT DOCUMENTS

CN     87107016 A    6/1988
CN    102537635 A    7/2012
(Continued)

OTHER PUBLICATIONS

Office Action and Search Report from the Chinese Patent Office dispatched Jul. 28, 2020 in related Chinese application No. 201810133619.8, and translation thereof.

*Primary Examiner* — Minh Truong
(74) *Attorney, Agent, or Firm* — J-Tek Law PLLC; Scott T. Wakeman; Mark A. Ussai

(57) ABSTRACT

A lubricant reservoir system includes a lubricant reservoir having an interior wall and an inlet for receiving lubricant from a supply. A follower device in the reservoir contacts the interior wall of the reservoir in a sliding and sealing manner, and the follower device is movable up and down in the reservoir from a first position to a second position in response to a changing lubricant level. A valve is in fluid communication with the inlet and is configured to selectively prevent a flow of the lubricant through the inlet. A connector operatively connects the follower device to the valve unit such that the flow of the lubricant through the inlet is prevented when the follower device is in the second position. The connector is configured such that the valve is positionable independently of the reservoir.

12 Claims, 5 Drawing Sheets

(51) Int. Cl.
*F16N 29/02* (2006.01)
*F16K 31/363* (2006.01)
*F16K 31/46* (2006.01)
*F16N 13/10* (2006.01)
*F16K 37/00* (2006.01)

(52) U.S. Cl.
CPC .......... *F16K 37/0008* (2013.01); *F16N 13/10* (2013.01); *F16N 19/003* (2013.01); *F16N 29/02* (2013.01); *F16N 2260/04* (2013.01); *F16N 2270/18* (2013.01)

(58) Field of Classification Search
CPC ......... E03D 1/302; F16K 21/16; F16K 21/18; F16K 31/1223; F16K 31/16; F16K 31/18; F16K 37/0008; F16K 37/0066; F16K 31/465
See application file for complete search history.

(56) References Cited

U.S. PATENT DOCUMENTS

| | | | |
|---|---|---|---|
| 2,636,441 A | 4/1953 | Woelfer | |
| 2,787,225 A | 4/1957 | Rotter | |
| 3,469,532 A | 9/1969 | Wegmann et al. | |
| 3,502,029 A | 3/1970 | Halladay | |
| 3,945,772 A | 3/1976 | Moortele | |
| 4,278,233 A | 7/1981 | Zurner et al. | |
| 4,487,340 A | 12/1984 | Shaffer | |
| 4,762,474 A | 8/1988 | Dartnall | |
| 5,285,812 A * | 2/1994 | Morales | F15C 1/14 137/386 |
| 5,601,413 A | 2/1997 | Langley et al. | |
| 6,102,676 A | 8/2000 | DiCarlo et al. | |
| 6,123,102 A | 9/2000 | Loegel | |
| 7,313,956 B1 * | 1/2008 | Murphy, Sr. | G01F 23/70 73/305 |
| 10,527,228 B2 * | 1/2020 | Holman | F16K 31/24 |
| 2007/0074759 A1 * | 4/2007 | McClung, Jr. | G01M 3/283 137/68.14 |
| 2010/0163121 A1 * | 7/2010 | Choi | B60P 3/224 137/512 |
| 2012/0103447 A1 | 5/2012 | Min et al. | |
| 2012/0145482 A1 | 6/2012 | Ifield et al. | |
| 2013/0256062 A1 | 10/2013 | Kotyk et al. | |
| 2015/0276088 A1 * | 10/2015 | Rutar | F16K 31/1223 137/625.69 |
| 2016/0169448 A1 * | 6/2016 | Holman | F01M 11/0004 184/6.4 |
| 2019/0024547 A1 * | 1/2019 | Gustafson | F16N 29/00 |

FOREIGN PATENT DOCUMENTS

| | | | |
|---|---|---|---|
| CN | 102575806 A | 7/2012 | |
| CN | 104185757 A | 12/2014 | |
| CN | 105452621 A | 3/2016 | |
| DE | 2919025 A1 | 11/1979 | |
| DE | 2840445 A1 | 4/1980 | |
| DE | 112013001703 T5 | 12/2014 | |
| GB | 1288636 | 9/1972 | |
| WO | 2016172519 A1 | 10/2016 | |
| WO | WO 2016172522 | 10/2016 | ............. F16N 11/08 |

* cited by examiner

LUBRICANT RESERVOIR SYSTEM

CROSS-REFERENCE

This application claims priority to German patent application no. 10 2017 202 083.0, filed on Feb. 9, 2017, the contents of which are fully incorporated herein by reference.

TECHNOLOGICAL FIELD

The disclosure relates to a lubricant reservoir system comprising a reservoir for receiving lubricant. The reservoir includes a top side, a base, a circumferential wall and an inlet for supplying lubricant into the reservoir from a supply. The disclosure further comprises a follower device in the reservoir that is in contact with the circumferential wall of the reservoir in a sliding and sealing manner. The follower device is movable up and down in the reservoir in response to a changing lubricant level. The disclosure also includes a valve unit, which is in fluid communication with the inlet in order to selectively prevent the lubricant flow through the inlet.

BACKGROUND

Pumps, such as those described in the following U.S. Pat. Nos. 2,187,684; 2,636,441; 2,787,225; 3,469,532; 3,502,029; 3,945,772; 4,487,340; 4,762,474; and 6,102,676, function to pump lubricant from a reservoir. When the quantity of lubricant in the reservoir has been depleted, the reservoir must be refilled with lubricant. The reservoir is typically filled via hoses, which are connected to a lubricant supply. The supply is often located remote from the reservoir. For example, the reservoir can be located in a truck outside a building. In order to avoid overfilling the reservoir, a user must stop pumping lubricant from the supply when the quantity of lubricant in the reservoir reaches a certain level. In some systems the user only becomes aware that the reservoir is full when the lubricant starts to run out from the reservoir through an overflow outlet. In other systems the user is notified by a light on the reservoir, which can in some instances be difficult to see due to the distance between the reservoir and the pump. Other systems include a costly and complex electrical shut-off system.

In DE 11 2013 001 703 T5 a lubricant reservoir system is disclosed that comprises a reservoir for receiving lubricant that includes a top side, a base, a circumferential wall, and an inlet for supplying lubricant into the reservoir from a supply. Furthermore a follower device is provided in the reservoir, which is in contact with the circumferential wall of the reservoir in a sliding and sealing manner, wherein the follower device in the reservoir moves up and down in response to a changing lubricant level in the reservoir. Furthermore a stop valve is provided that is in fluid communication with the inlet in order to selectively prevent the lubricant flow through the inlet, wherein the valve is operatively connected to the follower device in order to close the valve and prevent lubricant flow through the inlet when the lubricant in the reservoir reaches a predetermined level. The valve is disposed on the top side outside of the container. Once the follower device is in an upper position it actuates a lever mechanism, which in turn moves a rod upward and presses a valve element against a valve seat, whereby a lubricant flow through a lubricant channel in the valve body is prevented. An accidental overfilling of the reservoir is thus reliably prevented. The valve sits laterally to the center on the upper container edge, which requires a relatively high constructional expense. It is also absolutely necessary to lay the lubricant line over the upper edge of the container, traversing the valve housing. The lubricant line is configured as a hose and connected to the valve, and opens in the vicinity of the base through the circumferential wall in the reservoir.

SUMMARY

The solutions known in the prior art for preventing overfilling require a comparatively high constructional expense with a plurality of lubricant lines that must be laid from the reservoir to the valve and from the valve to the inlet. It is therefore an aspect of the present disclosure to provide a lubricant reservoir system that is less complexly constructed.

According to one advantageous design of the disclosure, a lubricant reservoir system is provided having the following features:
  a reservoir for receiving lubricant, wherein the reservoir includes an inlet for supplying lubricant into the reservoir from a supply,
  a follower device in the reservoir, which is in contact with the circumferential wall of the reservoir in a sliding and sealing manner, wherein the follower device is movable up and down in the reservoir in response to a changing lubricant level,
  a valve unit, which is in fluid communication with the inlet in order to selectively prevent the lubricant flow through the inlet,
  characterized in that furthermore the following features are comprised:
  an operative connection at least at times connecting the valve unit operatively to the follower device, which is configured such that the lubricant flow through the inlet is preventable when the lubricant in the reservoir reaches a predetermined lubricant level,
  the operative connection is configured such that the valve unit is placeable independently from the reservoir.

Due to the providing of an operative connection of the type that the valve unit is placeable independently from the reservoir, corresponding lubricant reservoir systems can be constructed significantly more simply than known in the prior art. The valve unit can also be simply and flexibly integrated into existing lubricant reservoir systems and placed in an existing lubricant line regardless of the existing structure. Accordingly, the operative connection can have any desired length and/or placement path. Thus the valve unit can be used, for example, in lubricant reservoir systems that are filled from below through the base of the reservoir by being placed inside the existing lubricant line. For this purpose the lubricant line can be separated and be connected to the valve unit via fittings. The corresponding lubricant reservoir system is consequently significantly more simply and more flexibly constructed in comparison to known systems. With embodiments of the disclosure corresponding to the new concept of lubricant reservoir systems, there are no constructional restrictions with regard to the paths of the lubricant lines. Only the shape and length of the operative connection is to be correspondingly designed and the valve unit to be integrated at a preferred location in the lubricant line.

The type of the operative connection can be permanent or only temporary. For example, the follower device can be operatively connected with the valve unit permanently due to the operative connection. The valve unit is to be configured accordingly. The operative connection can also exist only temporarily, for example, when the follower device is located just below an upper end position, i.e., close to the maximum filling of the reservoir.

In one advantageous design of the disclosure the operative connection comprises a flexibly placeable line. In particular the line is adaptable in length and in placement path according to the constructional circumstances of the respective lubricant reservoir system. The valve unit can thus be flexibly placed in any position and distance with respect to the follower device. It is thus also made possible in a simple manner to omit additional lubricant lines.

In one advantageous design of the disclosure the operative connection is connected to a blocking element of the valve unit, which is movably disposed and placeable in a blocking position blocking in the lubricant line.

Furthermore, in one advantageous design of the disclosure, an energy transfer element is provided that is configured such that the follower device is at times operatively connectable to the blocking element by contact with the energy transfer element. This can be, for example, a switch rod or a piston that is associated with the cover of the container and at times enters into contact with the follower device and thus imparts the operative connection to the blocking element.

In one advantageous design of the disclosure a force is transferable to the blocking element by the operative connection. For example, in the filling process the follower device performs a movement upward, and during this it permanently or temporarily exerts a force on the operative connection that is transferred from the operative connection to the blocking element. This direct coupling makes possible a simple and reliable controlling of the blocking element. Alternatively further elements can be present in the operative connection, which further elements control or influence the blocking element.

In one advantageous design of the disclosure the lubricant reservoir system further comprises:
 a first force element, by which at least at times a force is exertable on the follower device toward the lubricant in the reservoir,
 a second force element, by which at least at times a force is exertable on the blocking element toward the blocking position,
 wherein the first force element is configured to exert a greater force than the second force element.

The two corresponding force elements offer a simple possibility to optimize the force transmission from the follower device onto the blocking element of the valve unit. It is advantageous here that the force element disposed in relation to the follower device is configured to exert a greater force than the second force element associated with the blocking element. This is advantageous in particular with only temporary operative connection, i.e., when, for example, the follower device is only connected at times to the valve unit via the operative connection. This is the case, for example, in embodiments of the disclosure wherein the follower device is only in contact therewith in the upper region of the reservoir via an end of the operative connection, which, for example, can be embodied as a switch rod protruding into the reservoir. If the follower device is located below this region, the end of the operative connection then not in contact with the follower device is held in a base position by the first force element. The blocking element is thereby not placed in the lubricant line in its blocking position, with the result that the lubricant line is not blocked and lubricant flow is permitted, so that a filling via the lubricant line can start in due course. In this position the second force element specifically builds up a certain counterpressure that acts on the blocking element toward the blocking position, without, however, being able to overcome the force exerted by the first force element and acting against this counterpressure. Only if, by actuation of the operative connection by the follower device, the first force-field element, which can be embodied, for example, as exerted by a coil spring, is actuated and thus its exerted force reduced, can the second force element move the blocking element in the direction of the blocking position and thus end the filling process.

The operative connection can be designed in various ways. In one advantageous design of the operative connection it includes a Bowden cable or alternatively a hydraulic line. Such operative connections are flexibly placeable, cost-effective to produce, and function reliably. The length is adaptable to the corresponding situation, so that a long-distance effect on a valve unit placed distant from the container or with respect to the base or the circumferential wall of the reservoir is achieved.

Further advantages, features and details of the disclosure arise from the exemplary embodiments of the disclosure described in the following on the basis of the Figures.

DETAILED DESCRIPTION

Figure 1:
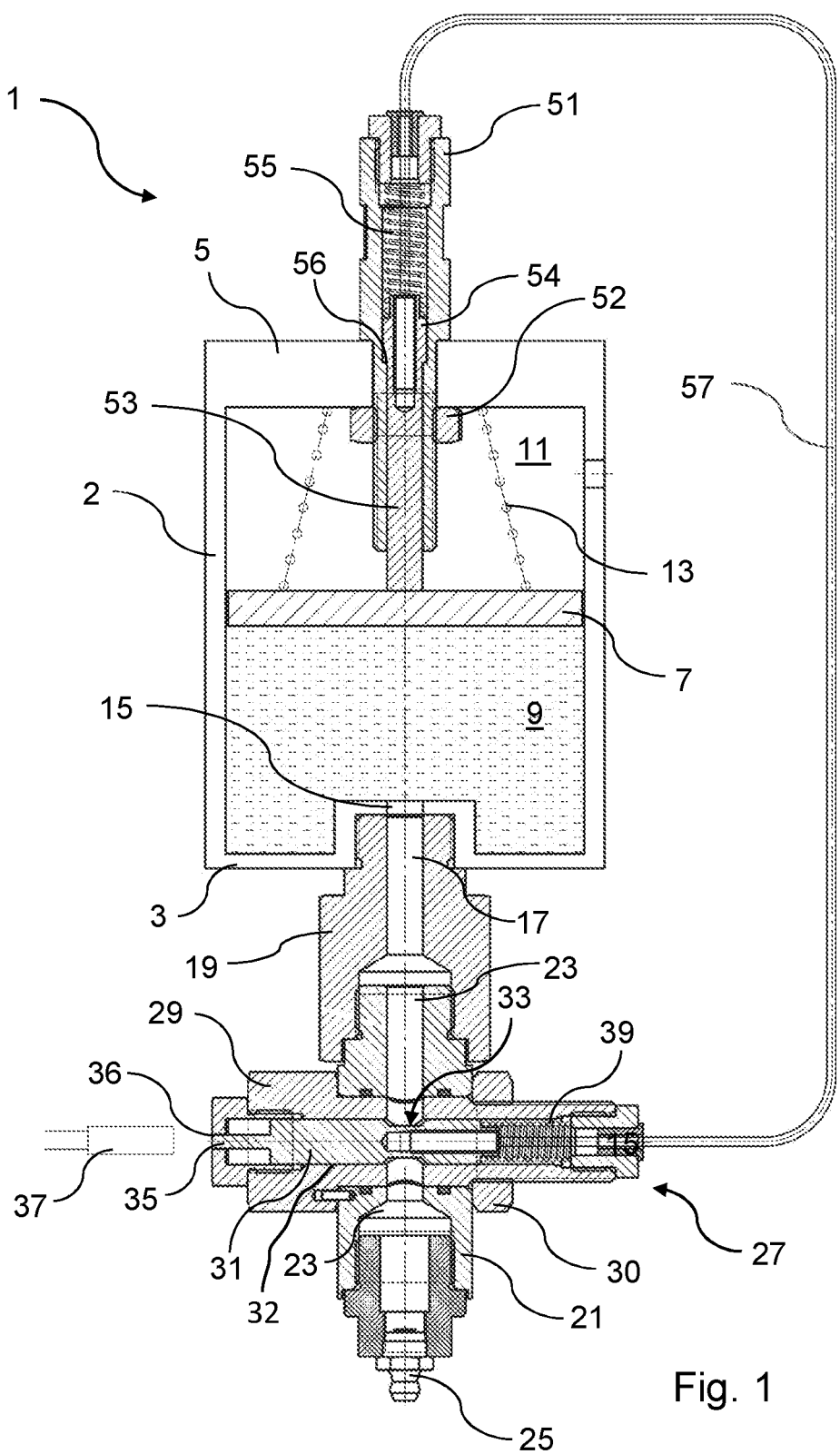
FIG. 1 shows a first embodiment of the disclosure.

In FIG. 1 a lubricant reservoir system according to a preferred embodiment of the disclosure is schematically depicted. It comprises a lubricant container 1, which is comprised of a housing wall 2, a base plate 3, and an upper cover unit 5. In the lubricant container 1 a follower piston 7 is disposed, which divides the lubricant container 1 into a lubricant space 9 and an empty space 11. The follower piston 7 is movably disposed in the lubricant container 1 such that it rests on the lubricant space 9. Depending on the fill level of the lubricant in the lubricant space 9 the follower piston 7 moves upward or downward; downward in the case of a lubricant removal, upward in the case of a filling with lubricant. Accordingly the lubricant space 9 and the empty space 11 enlarge or decrease corresponding to the movement of the follower piston 7. A spring unit 13 is disposed in the empty space 11 and is attached inside on the upper housing cover 5 and presses from above on the follower piston 7. Consequently it exerts a downwardly directed force on the follower piston 7 and presses it against the lubricant located in the lubricant space 9.

Below the lubricant container 1 in the region of the base plate 3 a lubricant inlet 15 is disposed as an opening of the base plate 3, into which a lubricant line 17 opens. The lubricant line 17 is formed within a pump unit 19, which is depicted here only schematically. Below the pump unit 19 a lubricant supply 21 is formed, which is screwed into the pump unit 19 and includes a lubricant line 23 that is fluidly connected to the lubricant line 17. On the lower end the lubricant supply 21 includes a lubricating nipple 25, to which a lubricant supply line is connectable. Via this, using a lubricant supply pump that is not depicted here lubricant can be introduced via the lubricating nipple 25 and the lubricant lines 23 and 17 to the lubricant inlet 15 and thus into the lubricant space 9.

A valve unit 27 is disposed inside the lubricant supply 21. This comprises a housing 29 that is inserted in a corresponding opening in the lubricant supply 21 transverse to the lubricant line 23, penetrating it, and attached using a nut 30. In the housing 29 a bore 32 oriented transverse to the lubricant line 23 is formed and in which a movable blocking piston 31 is disposed. In this embodiment the blocking piston 31 is therefore disposed transverse to the lubricant line 23. The blocking piston 31 has a central region of reduced diameter, which is configured as a constriction 33. In the depicted position the blocking piston 31 lies in a position such that the constriction 33 lies within the lubricant line 23. In this position it is possible to pump lubricant past the blocking piston 31 to the lubricant line 17. In this position the blocking piston 33 does not act in a closing or blocking manner Outside the region of the constriction 33 the diameter of the blocking piston 31 is greater, with the result that with a movement along the bore 32 (in the Figure to the left or right) a region of larger diameter comes to lie within the lubricant line 23 and blocks it. In this position of the blocking piston 31 it is not possible to pump lubricant through the lubricant line 23. The blocking piston 31 is then located in a blocking position.

On the end depicted on the left in FIG. 1 of the blocking piston 31, the blocking piston 31 includes an indicator pin 35 that visibly exits leftward from the housing 29 through an opening 36 in the housing 29 with movement of the blocking piston 31. This serves as an indicator for an operator that the inlet to the lubricant line 23 is blocked and the pump is to be switched off. The container 2 is then maximally filled. The length of the indicator pin 35 is chosen such that with the position of the constriction 33 in the lubricant line 23 the indicator pin 35 does not exit from the housing 29 and is thus completely hidden.

In one alternative embodiment a sensor 37 is provided that monitors the movement of the indicator pin 35 and upon its exiting, i.e., upon movement of the blocking piston 31 into the blocking position, automatically switches off the pump.

On the opposite side of the blocking piston 31, a spring 39 is disposed between the blocking piston 31 and the housing 39, which spring 39 is compressed in the depicted operating state, i.e., with the position of the constriction 33 in the lubricant line 23, and thus applies a leftward-directed force against the blocking piston 31. In principle the spring thus has the tendency to move the blocking piston 31 into its blocking position.

A housing element 51 is disposed on the upper end of the housing 2. The housing element 51 is hollow and protrudes into the empty space 11. It is attached to the inside of the cover unit 5 using a nut 52. In the housing element 51 a piston 53 is vertically movably disposed, the lower end of which piston 53 protrudes out of the housing element 51 into the empty space 11 of the container. In the region of the upper end, the piston 53 includes a section 54 having a larger diameter. Accordingly the housing element 53 includes a corresponding shoulder 56. In the position depicted the piston 53 is located on the lowermost end of its movement range, which is delimited by the interaction of the shoulder 56 with the section 54. The piston 53 can thus not penetrate into the empty space 11 farther than depicted.

In the housing element 51 a spring element 55 is disposed that applies a downwardly directed force against the piston 53 and thus presses it against the shoulder 56. On the upper end of the piston 53 a Bowden cable 57 is attached using a threaded pin. The other end of the Bowden cable 57 is attached to the blocking piston 31 using a threaded pin. The piston 53 and the blocking piston 31 are thus operatively connected via the Bowden cable 57. The spring 55 has a greater spring constant than the spring 39. Consequently the force with which the spring 55 presses the piston 53 against the shoulder 56 is greater than the force with which the spring 39 presses the blocking element toward the blocking position. Via their interaction with the piston 53 or the blocking element 31 both springs 55 and 39 effect opposite-acting tensile forces on the Bowden cable 57. Due to the force ratios the piston 53, the Bowden cable 57, and the blocking element 31 remain in the depicted position provided the follower piston 7 does not press the piston 53 upward.

The follower piston 7 moves up and down corresponding to the fill level of the lubricant in the container 2. It is pressed against the lubricant from above by the spring unit 13. If lubricant is removed from the container the spring unit 13 effects a movement of the follower piston 7 downward such that it always remains on the lubricant. In operating states of the lubricant reservoir system wherein less lubricant than depicted is available in the container 2, the follower piston 7 is located below the position depicted in FIG. 1. It is then not, as depicted, in contact with the lower end of the piston 53. Due to the force ratio of the springs 55 and 39, and the operative connection of the piston 53 to the blocking piston 31 via the Bowden cable 57, it is held in its depicted position; the lubricant line 23 is thus not blocked. If lubricant is now refilled through the open lubricant lines 23 and 17 into the container 2 the follower piston 7 moves upward. From the position depicted in FIG. 1 the follower piston 7 comes into contact with the piston 53 and exerts an upwardly directed force thereon. The movement resulting therefrom of the piston 53 upward presses spring 55 together and thereby reduces its tensile force on the Bowden cable 57. The spring 39 therefore then presses the blocking piston 31 toward its blocking position. When the follower piston 7 is at the upper stop and no more further lubricant is to be filled into the lubricant space 9 the blocking element has reached its blocking position. Subsequently the indicator pin 35 visibly exits the housing 29, and the operator or the sensor 37 initiates a switching-off of the lubricant supply pump. Until this occurs it is ensured by the blocked lubricant line 23 that no more lubricant reaches into the container, and an overfilling is prevented.

If lubricant is subsequently removed again, the follower piston 7 moves downward again, whereby the piston 53 is moved toward the shoulder 56 again by the spring 55. Correspondingly the blocking element 31 is moved back toward the depicted position and the lubricant line 23 is released. The spring 55 increasingly relaxes here while the spring 39 is tensioned.

Figure 2:
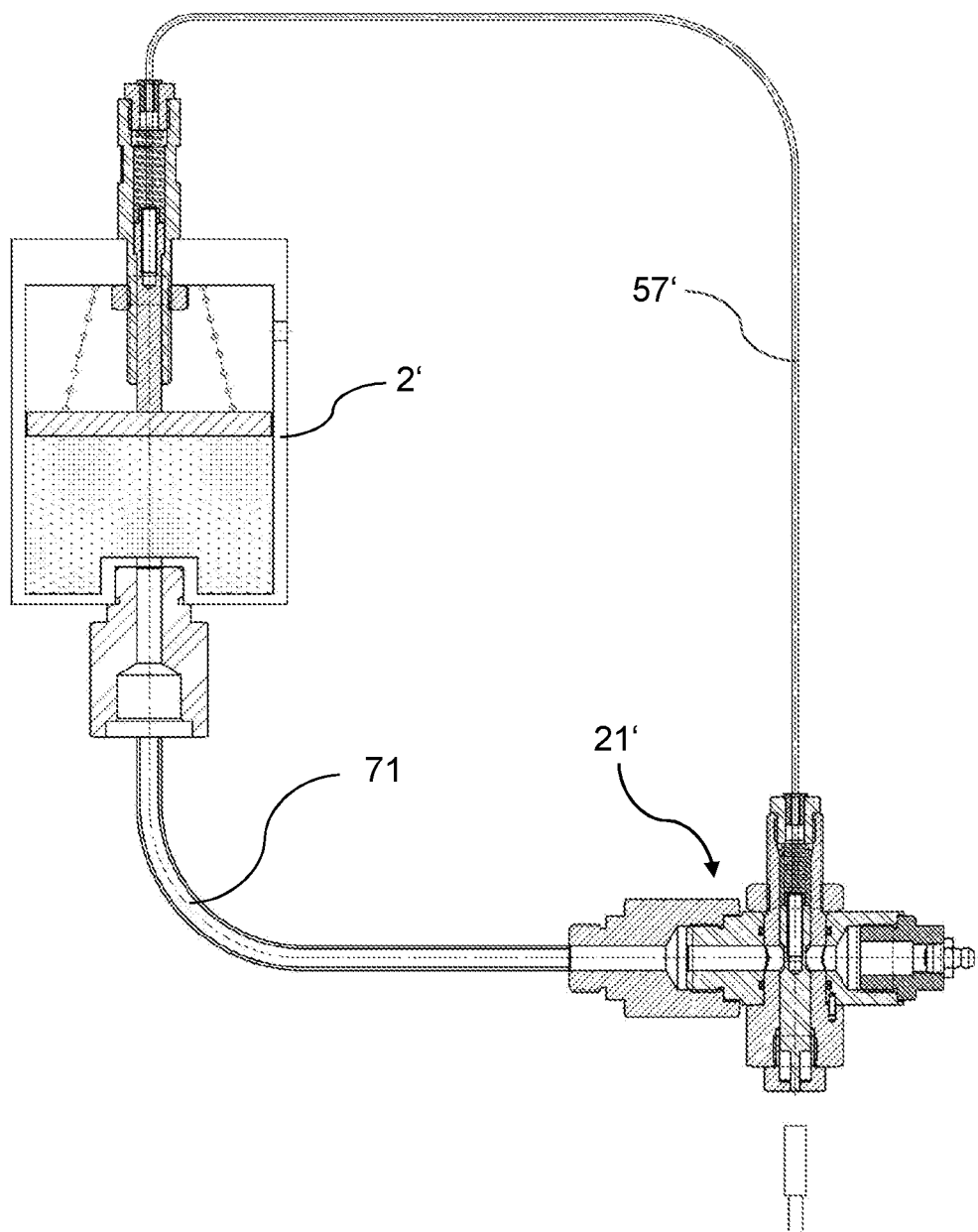
FIG. 2 shows a modification of the first embodiment of the disclosure.

In FIG. 2 an alternative embodiment of the disclosure is depicted as a modification of the embodiment depicted in FIG. 1. From the functional principle it resembles the embodiment in FIG. 1. It is different, however, in that a longer lubricant line 71 is disposed between the pump unit 19' and the lubricant supply 21'. This can be flexible and be flexibly exchanged. In this respect the Bowden cable 57' is also longer and differently placed in this embodiment. The spatial orientation and position of the lubricant supply 21' is irrelevant to its function. Using this embodiment lubricant reservoir systems can also be formed wherein the lubricant supply 21 can be disposed distant and independent from the container 2' and in particular its cover. There are no restrictions with regard to the placement of the lubricant line with respect to the inlet. The lubricant supply 21' can be universally used and retrofitted for many lubricant reservoir systems.

Figure 3:
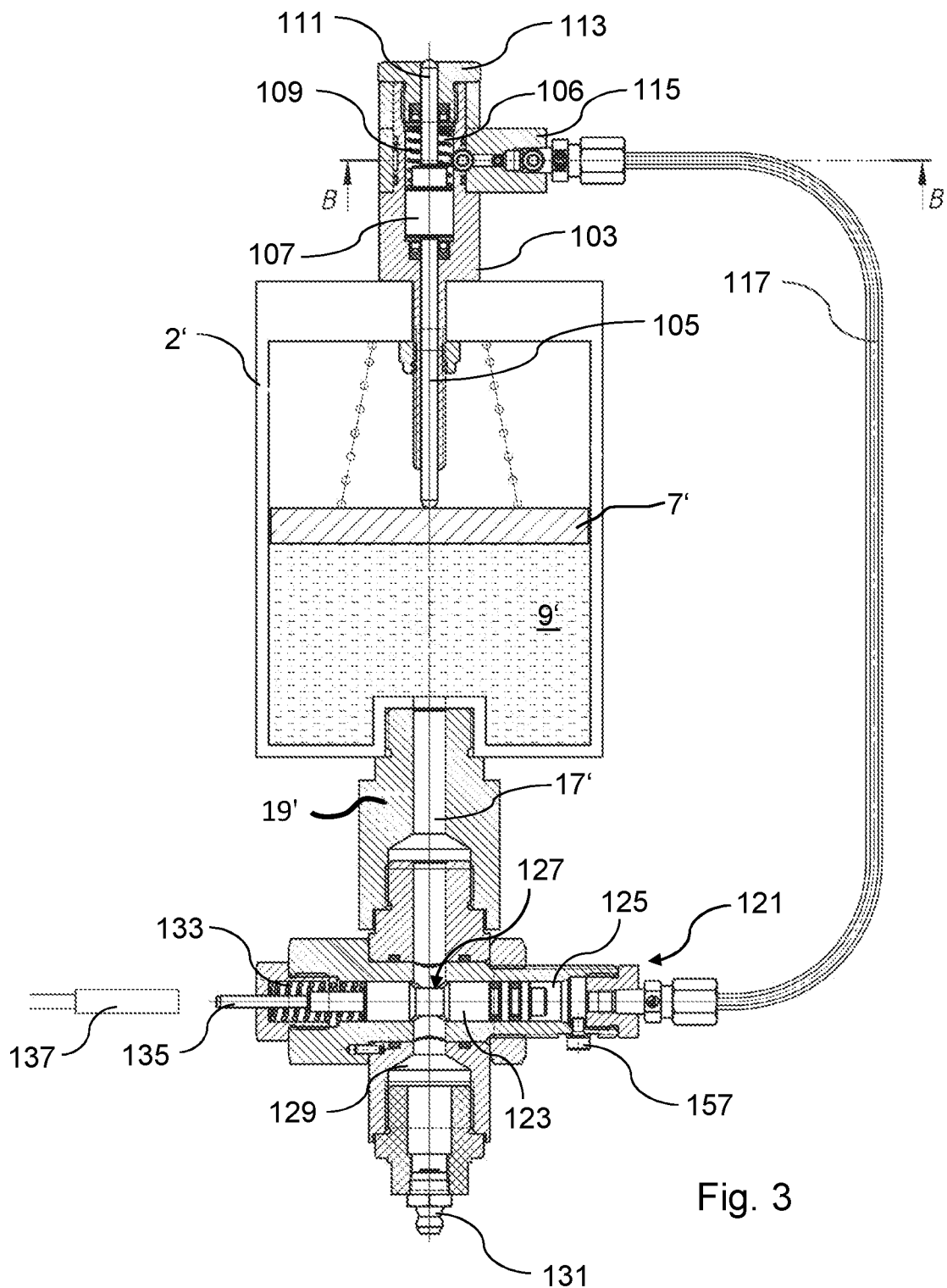
FIG. 3 shows a second embodiment of the disclosure.

A further exemplary embodiment of the disclosure is depicted in FIG. 3. In relation to the container 1' and the follower piston 7' disposed therein it is constructed analogously to the exemplary embodiment of FIGS. 1 and 2. Only the force transfer between the blocking element of the valve unit and the follower piston 7 is structured differently and shall be described in detail here. On the upper edge of the housing wall 2' a housing 103 is disposed, where a piston 105 is vertically movably disposed. In the depiction of FIG. 3 the piston 105 is located in its lowermost position, analogously to the depiction of FIG. 1. During a filling process, when the lubricant space 9' is thus filled with new lubricant by the lubricant line 17', the follower piston 7' is located during its upward movement in the position wherein it comes into operative contact with the piston 105. With further filling of the lubricant space 9' the follower piston 7' moves farther upward and subsequently presses the piston 105 upward. The housing 103 forms a cavity 106 wherein a hydraulic ram 107 is disposed. The hydraulic ram 107 is connected to the piston 105 and thus follows its vertical movement. Within the cavity 106 a spring 109 is disposed that holds the hydraulic ram 107 in the initial position provided the follower piston 7' does not work against the spring force of the spring 109 and press the hydraulic ram upward. Above the hydraulic ram 107 an indicator pin 111 is disposed that in the depicted state does not yet protrude from the upper housing edge 113 of the housing 103. However, if a further upward movement of the piston 105, of the hydraulic ram 107, and thus of the indicator pin 111 takes place, it exits from the housing 113 and indicates the approaching end of the filling process. Laterally on the housing 103 a pressure compensation unit 115 is screwed-in, which is explained in more detail in FIG. 5 on the basis of the sectional view B-B. At the end of its movement the hydraulic ram closes a hydraulic channel extending laterally with respect to the pressure compensation unit 115. On the pressure compensation unit 115 a hydraulic hose 117 is disposed that is connected on the other end to a blocking unit 121. A blocking element 123 is movably disposed in the blocking unit 121. It is configured comparably to the blocking element 31 from the exemplary embodiment of FIG. 1. In the blocking unit 121 a hydraulic volume 125 is formed, into which the hydraulic hose 117 opens. The hydraulic volumes 125 of the hydraulic hose 117, the pressure compensation unit 115, and the cavity 106 are filled with hydraulic fluid, for example, a hydraulic oil. In the depicted initial position the blocking element 123 is not located in its blocking position but rather with a constriction 127 in the lubricant line 129. In this position it is possible to introduce lubricant via a lubricating nipple 131 and the lubricant lines 129 and 17' into the lubricant space 9'. Using a spring element 133 the blocking element 123 is held in the situated position. On the left end of the blocking element an indicator pin 135 is disposed that visibly exits the housing of the blocking unit 121 with movement of the blocking element 123 into a blocking position, i.e., to the left in the chosen drawing view, and indicates the approaching end or the end of the filling process. Accordingly the end of the filling process is indicated to an operator so that he can stop the pump for supplying lubricant. Accordingly the indicator pin 135 can include visual markings that indicate the approaching end of the filling process by an orange marking and the end by a red marking, which markings are disposed in sequence on the indicator pin. Alternatively a sensor 137 can also be provided here that optically detects the movement of the indicator pin 135 and automatically switches off a corresponding pump.

If now with further filling of the lubricant reservoir 9' the follower piston 7' comes into contact with the piston 105 and presses it upward, then hydraulic fluid is displaced out of the cavity 106 via the also-upwardly-moved hydraulic ram 107. Accordingly the pressure in the hydraulic line 117 and in the hydraulic space 125 increases, with the result that hydraulic fluid is displaced from the cavity 106 via the hydraulic line 117 into the hydraulic space 125. Accordingly in the depiction of FIG. 3 the blocking element 123 is moved leftward against the pressure of the spring 133 so that it is located in its blocking position when the follower piston 7' has reached its highest point. Then the lubricant supply through the lubricant line 129 is blocked. Even with the lubricant supply pump still running, from this point in time no further lubricant can reach through the line 17' into the lubricant space 9', with the result that an overfilling is prevented.

When the constriction 127 lies in the lubricant line 129, the indicator pin 135 is partially outside the housing of the blocking unit 121. Should the hydraulic system fail, for example, due to a hose tear or a leakage, the hydraulic oil would no longer be able to build up pressure whereby the spring 133 would press the blocking piston 123 rightward. Then the lubricant line 129 would be blocked and the indicator pin 135 entirely disappear in the blocking unit 121. The malfunction of the hydraulic system is thereby indicated to an operator so that appropriate measures can be taken.

Figure 4:
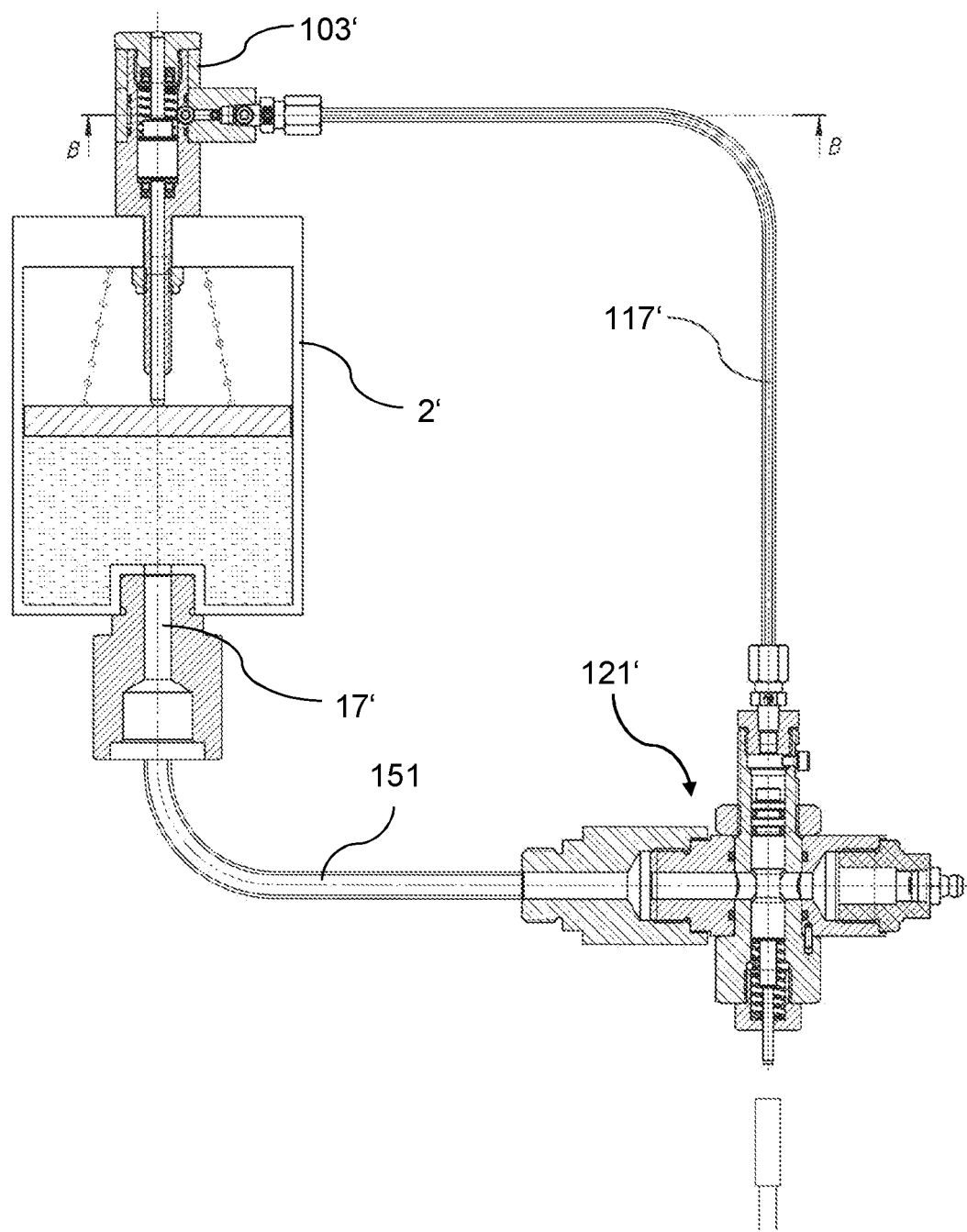
FIG. 4 shows a modification of the second embodiment of the disclosure.

A modification, analogous to FIG. 2, of the exemplary embodiment of FIG. 3 is depicted in FIG. 4. The blocking unit 121' is constructed analogously to the exemplary embodiment of FIG. 3. The same applies for the housing 103'. Only the lubricant line 17' is connected to the blocking unit 121' via a lubricant line 151, with the result that the blocking unit 121' is placeable independently of the placement and position of the container 2. Accordingly the hydraulic line 117' is placed differently; however, wherein it opens into the blocking element 121' with function analogous to as in the exemplary embodiment of FIG. 3.

Figure 5:
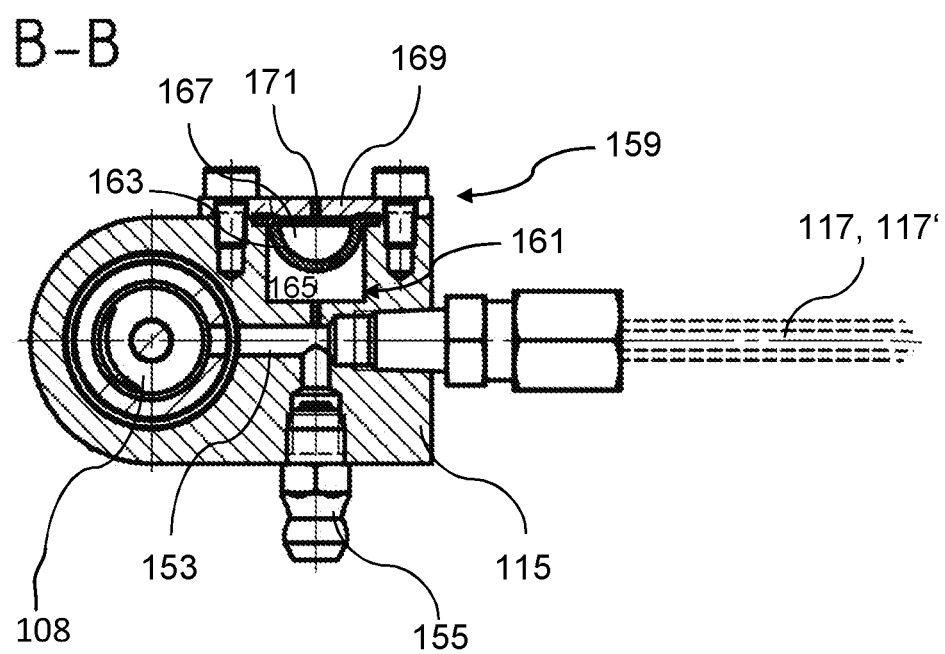
FIG. 5 shows a section view B-B according to FIGS. 3 and 4.

In FIG. 5 a sectional view of the section B-B of FIGS. 3 and 4 is depicted, on the basis of which the function of the pressure compensation unit 115 is explained. In the view from below, the hydraulic space 108 is depicted in cross-section; the hydraulic space 108 is connected to the hydraulic line 117 or 117' via a hydraulic line 153. An inlet 155 is located laterally, via which inlet 155 hydraulic fluid is introducible into the hydraulic system. Correspondingly and depicted in FIG. 3 an inlet 157 is located in the blocking unit 121, via which inlet 157 the hydraulic oil is suppliable or dischargeable. The hydraulic system can also be vented via these two inlets 155 and 157. As with other hydraulic systems a venting is necessary in order to effect a direct and complete force transfer in the event of a pressure increase. Opposite the inlet 155 a pressure compensation volume 159 is formed in the pressure compensation unit 115. It comprises a cavity 161, which is also filled with hydraulic oil and connected to the hydraulic line 153. Within the cavity 161 a membrane 163 is disposed that is flexible inward in the event of loss of hydraulic oil. It divides the cavity 161 into a hydraulic space 165 and an air space 167. The air space 167 is protected against environmental influences by a protective plate 169. The protective plate 169 includes a ventilation opening 171 in order to allow a pressure compensation. If the hydraulic space 165 is now filled with hydraulic oil via the inlet 155 the membrane 163 bulges toward the protective plate 169, and the air space 167 thus correspondingly decreases. A maximum fill level is thus also defined by the protective plate 169. Starting from this fill level hydraulic oil escapes from the inlet 157. If a slight loss of hydraulic oil occurs in operation of the system, then the membrane 163 bulges inward via the air pressure and the ventilation opening 171, and the loss of hydraulic volume is thus compensated without air being able to enter into the hydraulic system. A reliable operation of the hydraulic system is thus possible.

In an alternative embodiment of the disclosure, the operative connection can also be embodied via an electrical system. In this respect an electrical connection is provided instead of the Bowden cable or the hydraulic line, which electrical connection transmits an electrical signal to the valve unit via a corresponding activator pin that is operated analogously to the follower piston; the electrical signal can then drive a blocking element into the lubricant line, for example, in an electrically driven manner.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Furthermore, each of the additional features and teachings disclosed above may be utilized separately or in conjunction with other features and teachings to provide improved lubricant reservoir systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1, 1' Lubricant container
2, 2' Housing wall
3 Base plate
5 Cover unit
7, 7' Follower piston
9, 9' Lubricant space
11 Empty space
13 Spring unit
15 Lubricant inlet
17, 23, 17', 129, 151 Lubricant line
19, 19' Pump unit
21, 21' Lubricant supply
25, 131 Lubricating nipple
27 Valve unit
29, 103 Housing
31 Blocking piston
32 Bore
33, 127 Constriction
35, 111, 135 Indicator pin
36 Opening
37, 137 Sensor
39, 109 Spring
51 Housing element
52 Nut
53, 105 Piston
54 Section
55, 133 Spring element
56 Shoulder
57, 57' Bowden cable
103 Housing
107 Hydraulic ram
106, 161 Cavity
113 Housing edge
115 Pressure compensation unit
117 Hydraulic hose
121 Blocking unit
123 Blocking element
125 Hydraulic volume
153 Hydraulic line
155, 157 Inlet
159 Pressure compensation volume
163 Membrane
165 Hydraulic space
167 Air space
169 Protective plate
171 Ventilation opening

The invention claimed is:

1. A lubricant reservoir system, comprising:
a lubricant reservoir having an interior wall and an inlet for receiving lubricant from a supply,
a follower in the reservoir in contact with the interior wall of the reservoir in a sliding and sealing manner, the follower being movable up and down in the reservoir and being shiftable from a first position to a second position in response to an increase in a lubricant level and from the second position to the first position in response to a decrease in the lubricant level,
a valve in fluid communication with the inlet, the valve being shiftable from an open position to allow a flow of the lubricant through the inlet to a closed position to prevent the flow of lubricant through the inlet, and
force transfer means for transferring a force produced by the movement of the follower to the valve to shift the valve to the closed position in response to the follower shifting to the second position such that the flow of the lubricant through the inlet is prevented when the follower is in the second position,
wherein the valve includes a valve body having a first end and a second end, the valve body being slidable from a first position defining the open position of the valve to a second position defining the closed position of the valve,
wherein the force transfer means comprises:
a hydraulic ram in a first hydraulic space, the hydraulic ram being movable by the follower from a first position to a second position,
a second hydraulic space at the second end of the valve, and a hydraulic line containing a hydraulic fluid connecting the first hydraulic space to the second hydraulic space, and wherein movement of the follower from the follower first position to the follower second position moves the hydraulic ram from the ram first position to the ram second position and transfers force from the follower to the second end of the valve body to shift the valve body from the valve body first position to the valve body second position.

2. The lubricant reservoir system according to claim 1, further including a lubricant line fluidly connected to the inlet.

3. The lubricant reservoir system according to claim 1, wherein the reservoir includes a base and a side wall and a top and wherein the inlet is disposed in the base or in the side wall.

4. The lubricant reservoir system according to claim 1, wherein the reservoir includes a base and a side wall and a top and wherein the inlet is disposed in the base or in the side wall and wherein the follower includes a rod extending through the top.

5. The lubricant reservoir system according to claim 1, further comprising:
a first spring element, by which at least at times a force is exertable on the follower toward the lubricant in the reservoir, and
a second spring element, by which at least at times a force is exertable on the valve body.

6. The lubricant reservoir system according to claim 1, including:
a first spring biasing the valve body toward the valve body first position; and
a second spring biasing the hydraulic ram toward the ram first position.

7. The lubricant reservoir system according to claim 1, wherein the force transfer means is configured to transmit the force along a curved path.

8. A lubricant reservoir system, comprising:
a lubricant reservoir having an inlet for receiving lubricant from a supply and having a top and a bottom and a side wall, the side wall having an interior surface, the inlet being located in the bottom of the lubricant reservoir or in the side wall of the lubricant reservoir,
a follower piston in the reservoir in contact with the interior surface of the side wall of the reservoir in a sliding and sealing manner, the follower piston being movable up and down in the reservoir from a first position to a second position in response to a changing lubricant level,
a shaft extending from the follower piston through the top of the lubricant reservoir,
a valve in fluid communication with the inlet, the valve being shiftable from a first position allowing a flow of the lubricant through the inlet to a second position blocking the flow of the lubricant through the inlet, and
a cable or a hydraulic line having a first end operatively connected to the shaft and a second end operatively connected to the valve such that a movement of the piston transfers a force via the cable or through hydraulic fluid in the hydraulic line to affect a position of the valve.

9. The lubricant reservoir system according to claim 8, wherein the cable or the hydraulic line comprise a cable.

10. The lubricant reservoir system according to claim 9, wherein the cable comprises a Bowden cable.

11. The lubricant reservoir system according to claim 9, further including
a first spring biasing the first valve toward the first position,
a second spring biasing the valve toward the second position,
wherein the first spring has a larger spring constant than the second spring.

12. The lubricant reservoir system according to claim 9, wherein the valve is spring biased toward the first position by a first spring and spring biased toward the second position by a second spring and wherein movement of the follower piston toward the second position at least partially overcomes the bias of the first spring.

* * * * *